SCHULTZ & ADAMS.
Rotary Cultivator.
No. 64,580. Patented May 7, 1867.
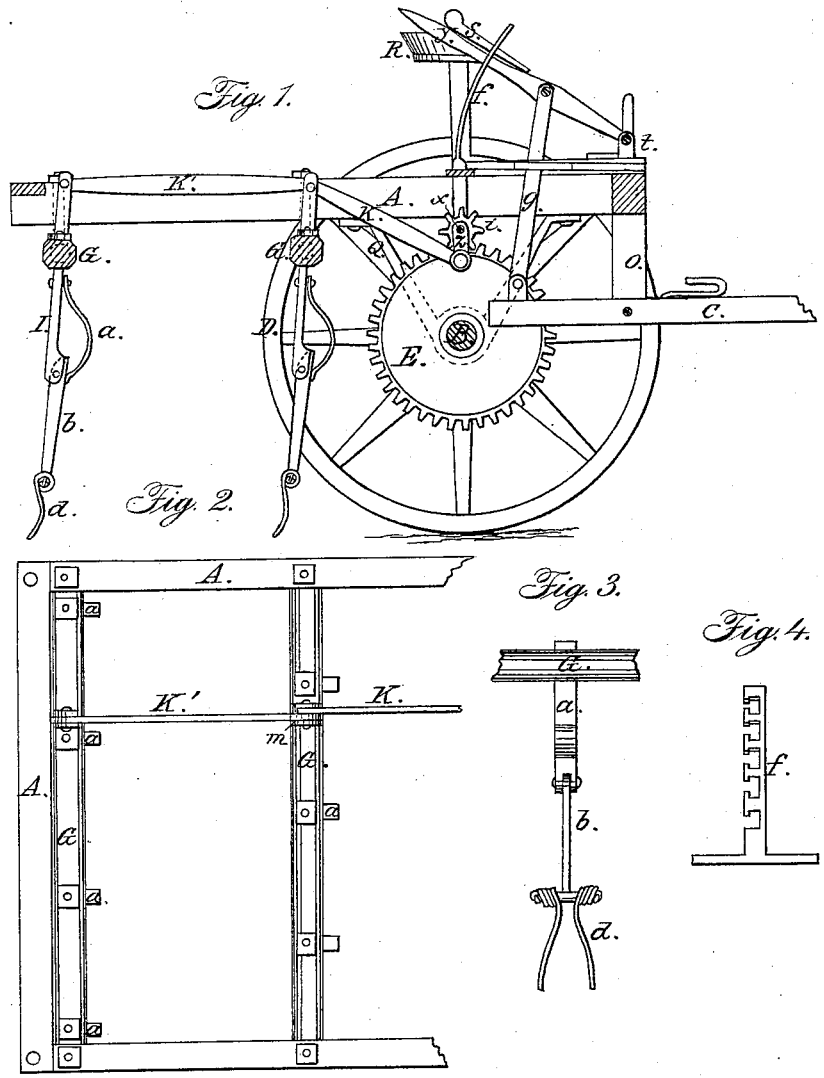
Witnesses:
A.M. Ward
V. D. Stockbridge
Inventor:
J. D. Schultz
R. Adams
per
Alexander Mason
Atty

United States Patent Office.

J. DAVID SCHEETZ AND REUBEN ADAMS, OF ROBESONIA, PENNSYLVANIA, ASSIGNORS TO THEMSELVES AND JOHN McKNIGHT.

*Letters Patent No. 64,580, dated May 7, 1867.*

---

CULTIVATORS.

---

The Schedule referred to in these Letters Patent and making part of the same.

---

TO ALL WHOM IT MAY CONCERN:

Be it known that we, J. DAVID SCHEETZ and REUBEN ADAMS, of Robesonia, in the county of Berks, and in the State of Pennsylvania, have invented certain new and useful improvements in "Cultivators;" and do hereby declare that the following is a full, clear, and exact description thereof, reference being had to the accompanying drawings, and to the letters of reference marked thereon, making a part of this specification.

Figure 1 represents a longitudinal vertical section.

Figure 2, a plan view of the rear end of the frame.

Figure 3, a front elevation of the jointed arm with spring-rake attached; and

Figure 4, a view of the bar which holds the thills in the required position.

Our invention is intended to cultivate the earth after being ploughed and harrowed, or after being ploughed, and can be used in lieu of rake or for spreading hay upon the ground for drying. It consists of a frame of a suitable size, made of a square or oblong form, supported upon an axle with wheels.

In the annexed drawings, A represents the frame elevated above and supported upon the axle B by means of the U-shaped braces Q, and is connected at its front to the thills C by the small pendent bars O. This frame may be of any length required for the number of rakes to be used. G G represent horizontal bars, which are placed from side to side of this frame, in rear of the axle B, at suitable distances from each other, and pivoted to the frame by means of metallic loops or otherwise. Each of these shafts is provided with a series of metallic arms, I, which project about half way between the said bars and the ground. Pivoted to the lower end of each arm is a metallic (inverted) T-shaped bar, which has a spring-rake, $d$, connected to the end and of a length so that the end of the rake may rest upon the earth. It will be seen that each of these rakes $d$ is wound around the ends of the bars $b$ in such a manner that they form a spring; also that a curved spring, $a$, is secured to each arm I, with its lower end curved and resting in front of the bars $b$, so that when the rakes are thrown to the rear, their upper ends pressing, the springs open, are thus forced back after striking the earth and being released. Stationed upon the axle B is a large cog-wheel, E, which meshes into a small cog-wheel, $i$, upon the short shaft $x$, above the axle. This shaft has a crank, $z$, at its end, and to which is connected the pitman K, which is attached between suitable ears, $m$, upon the first shaft G, in the rear of the axle, while there is an additional pitman, K′, extending from the first to the second shaft G, and there may be to the third, fourth, and so on, (according to the number of shafts,) for operating the said shafts upon their pivots and causing the arms to be forced back and forward. One of the thills C extends under the forward part of the frame A, and to the end of which is connected the vertical bar $g$, which is pivoted near its centre to the lever $y$, which regulates the depth of insertion of the rakes. This lever extends from the pivot at its end to the seat of the driver R, who operates the elevating device for cultivating. At the side of the seat is the eccentric rack-bar $f$, for securing the lever $y$, (by means of a wedge, S,) in the place required. When this lever is placed in the upper notch of this bar the weight of the rear end of the frame A will cause the rakes to penetrate the earth deeper than when the lever is in the lower notch. When the horses are attached to this cultivator and it is drawn forward, the revolutions of the axle by means of its cog-wheel cause the shafts G to vibrate, and the rakes to scatter and cultivate the earth, or to spread the hay, as desired.

Having thus fully described our invention, what we claim as new, and desire to secure by Letters Patent, is—

1. The arrangement of the frame A, with its shafts G, arms I I, bars $b\ b$, and springs $a\ a$, with rakes $d$, when operated in the manner and for the purposes set forth.

2. The elevation or depression of the frame with its cultivators by means of the bar $g$ and lever $y$, attached to the thill C, in the manner substantially as and for the purposes specified.

In testimony that we claim the foregoing we have hereunto set our hands this 20th day of March, 1867.

J. DAVID SCHEETZ,
REUBEN ADAMS.

Witnesses:
SAMUEL HAIN,
J. D. CLOUS.